US006850552B2

(12) United States Patent
Bibl

(10) Patent No.: US 6,850,552 B2
(45) Date of Patent: Feb. 1, 2005

(54) ITERATIVE PRECISION SPECTRUM ANALYSIS

(76) Inventor: Klaus Bibl, 31 Kilburn Rd., Belmont, MA (US) 02478

( * ) Notice: Subject to any disclaimer, the term of this patent is extended or adjusted under 35 U.S.C. 154(b) by 716 days.

(21) Appl. No.: 09/728,846

(22) Filed: Dec. 1, 2000

(65) Prior Publication Data

US 2002/0101917 A1 Aug. 1, 2002

(51) Int. Cl.[7] .............................................. G01S 13/95
(52) U.S. Cl. ........................ 375/130; 375/346; 342/134; 342/137; 342/192; 342/195
(58) Field of Search .............................. 375/130, 346; 342/134, 137, 192, 195

(56) References Cited

U.S. PATENT DOCUMENTS

| | | | |
|---|---|---|---|
| 4,594,695 A | 6/1986 | Garconnat et al. | |
| 4,613,978 A | 9/1986 | Kurth et al. | |
| 4,792,915 A | 12/1988 | Adams et al. | |
| 4,803,994 A | 2/1989 | Burke | |
| 4,837,720 A | 6/1989 | Rambaut | |
| 4,843,583 A | 6/1989 | White et al. | |
| 4,942,546 A | 7/1990 | Rambaut | |
| 5,018,088 A | 5/1991 | Higbie | |
| 5,227,801 A | 7/1993 | Pierce | |
| 5,233,354 A | 8/1993 | Roth et al. | |
| 5,353,233 A | 10/1994 | Oian et al. | |
| 5,412,390 A | 5/1995 | Peavey et al. | |
| 5,545,976 A | 8/1996 | Cutler | |
| 5,602,751 A | 2/1997 | Edelblute | |
| 5,691,924 A | 11/1997 | Czyzewski et al. | |
| 5,748,143 A | 5/1998 | Melvin, Jr. et al. | |
| 5,831,569 A | * 11/1998 | Schultheis et al. | ............ 342/88 |
| 6,081,221 A | 6/2000 | Zrnic et al. | |
| 6,307,500 B1 | 10/2001 | Cornman et al. | |
| 2003/0048901 A1 | * 3/2003 | Cangiani et al. | ............ 380/252 |

OTHER PUBLICATIONS

Capon, J., High–Resolution Frequency–Wavenumber Spectrum Analysis, Proceedings of the IEEE, vol. 57, No. 8, Aug. 1969, pp. 1408–1419.

Burg, J.P., Maximum Entropy Spectral Analysis, paper presented at 37th Meeting of the Society of Exploration Geophysicists, Oklahoma City, Oklahoma, 1967, Modern Spectrum Analysis, edited by Donald G. Childers, IEEE Press, pp. 34–41.

Kanasewich, E.R., Time Sequence Analysis In Geophysics, 3rd Edition, 1981, The University Of Alberta Press, pp. 143–183.

Kay, S.M., Modern Spectral Estimation, Theory & Application, 1998, Prentice Hall, Englewood Cliffs, NJ, pp. 431–439.

(List continued on next page.)

*Primary Examiner*—Amanda T. Le
(74) *Attorney, Agent, or Firm*—Blakely, Sokoloff, Taylor & Zafman

(57) ABSTRACT

Simultaneous improvement in resolution, frequency range, dynamic ranges, as well as signal-to-noise ratio of spectrum analysis is possible by the huge increase in speed and capacity of digital data processing. In coherent pulse sounding (especially in monostatic Radar and Sonar), precise determination of the frequency, amplitude, and phase of wanted signals and unwanted interferers in the frequency domain and their elimination in the time domain data set leads to substantial improvement in the dynamic range of the analysis. Thus, a new apparatus and method of unevenly spaced transmitter pulses becomes feasible to increase the number of samples in a time period limited by the coherency requirements of the data set. The invented apparatus and method overcomes the inherent limitation in dynamic range of the spectral amplitudes due to cross-talk and sparse sampling. Non-linear spectrum analysis can improve signal-to noise further. Pre-cleaning of spread-spectrum data is another application of this method.

4 Claims, 3 Drawing Sheets

OTHER PUBLICATIONS

Haykin, S., Editor, Advances in Spectrum Analysis and Array Processing, vol. II, Prentice Hall Advanced Reference Series, Prentice Hall, Englewood Cliffs, NJ, pp. 263–273.

Schmidt, Ralph Otto; A Signal Subspace Approach To Multiple Emitter Location And Spectral Estimation; Ph.D. Dissertation, Stanford University; Nov. 1981; cover pages, pp. v–xii, pp. 1–201; Copyright Ralph Otto Schmidt 1982.

Bibl, Klaus and Haines, Mark D.; 1024–Chip Staggered Pulse Code For Spacecraft Ionosondes And Radar; University of Massachusetts–Lowell, Center for Atmospheric Research; 600 Suffolk Street; Lowell, MA 01854; Honoring Prof. Bodo W. Reinisch at his 60th birthday.; pp. 1, 2,4,5–7 and pp. 2–7.

Search Report for PCT/US01/45682 mailed Mar. 22, 2002, 1 page.

* cited by examiner

ITERATIVE PRECISION SPECTRUM ANALYSIS

BACKGROUND OF THE INVENTION

1. Field of the Invention

The present invention relates to methods and apparatuses for spectrum analysis and encoding and decoding data.

2. Description of Related Art

In monostatic pulse sounding, creation of many samples in a relatively short time is often needed because the signal-to-noise ratio may be very poor or the signals have large Doppler frequencies due to the fast movement of the reflector. Complementary pulse or Barker codes have been used for those conditions; but their use is limited if the Dopplers are very high. If, in addition, echoes from short ranges can occur simultaneously with large ranges, these phase-coded pulse sequences can not be used to increase the number of samples for signal-to-noise ratio improvement.

In this case, another unevenly spaced phase code, the staggered pulse code is proposed. We have developed a staggered pulse code which provides 128 phase-coded samples in the time space of two equally spaced pulses. In the spectral domain, however, the staggered pulse code has only a very limited dynamic range due to the cross-talk between the ranges and the leakage of any frequency into other spectral channels. This is already true for the complementary pulse or the Barker codes if there is a large Doppler present. Even in standard spectrum analysis of equally spaced samples, the sin x/x properties of the method limit the dynamic range. It has been overcome by filtering; but this process widens the spectral lines and decreases signal-to-noise.

In coherent radio or acoustic Radar and in ionosondes, the expected echoes in each range bin are coherent and are limited in number. In those applications, the noise often consists of a limited number of coherent interferers with a limited bandwidth, smaller than the pulse bandwidth. Many methods have been developed, like the Maximum Likelihood Method (MLM) (J. Capon (1969), "High-resolution Frequency-wave-number Spectrum Analysis", Proc. IEEE, v 57, p. 1408–1418.), the Maximum Entropy Method (MEM) (J. P. Burg (1967) "Maximum Entropy Spectral Analysis", paper presented at 37th Annual International SEG Meeting, Oklahoma City, Okla., and reprinted in "Modem Spectrum Analysis, edited by Donald G. Childers, IEEE Press.), and MUSIC (R. O. Schmidt (1981), "A Signal Subspace Approach to Multiple Emitter Location and Estimation", Ph.D. Dissertation, Stanford University.) which have been described in several books (E. R. Kanasewich, "Time Sequence Analysis in Geophysics", 3rd Edition (1981), The University of Alberta Press; S. M. Kay, "Modem Spectral Estimation", (1998), Prentice Hall, Engewood Cliffs, N.J.; R. W. Hamming, S. Haykin, Editor, "Advances in Spectrum Analysis and Array Processing", Prentice Hall Advanced Reference Series). On the subject, several patents have been awarded. The most relevant have been referenced here. In particular, in U.S. Pat. No. 4,613,978, narrow band interference suppression is proposed by cutting out large amplitudes in the spectrum. This method, as all the mentioned mathematical solutions which use computer time consuming matrix inversion, disregards the phase of signal and interference and work on the power spectrum.

Most of the data from ionosondes and other coherent Radars are organized in 3- or 4-dimensional displays with frequency on the horizontal axis and range on the vertical axis. To make those displays readable, only a limited number of ranges can be occupied by data. Any range can just display an amplitude and an identifier (Doppler, Polarization or incidence angle). Unfortunately, conventional spectral analysis has not produced effecient methods for optimizing the signal-to-noise ratio under these conditions.

SUMMARY OF THE INVENTION

Substantial increase in computer speed and storage capacity has made it possible to consider spectrum analysis in new ways. If one signal or source of interference dominates the rest of the data, it contaminates all other data. Therefore, the strongest spectral line and its phase should be determined in the spectral domain and the respective sine and cosine function should be taken out of the original time data set. The modified data set should be spectrum analyzed again and the process repeated until a sufficient number of sine and cosine functions are created to fill a reasonable number of ranges with data. When a large amount of data must be processed in real time this way, it might be necessary to dedicate a special purpose computer for this calculation. The proposed method is explained in the section below.

The first application of the Iterative Spectrum Analysis is the pre-cleaning of coherent interference. Pre-cleaning is necessary before searching for the signals if very strong coherent interferers may occur in the data set. This method is described below.

In case of strong noise conditions, non-linear spectrum analysis, which improves the signals-to-noise by more than 6 dB, can be used to determine the strongest signal more accurately in frequency, amplitude, and phase. The proposed non-linear spectrum analysis is explained in a later section.

For coherent Radars and Sonars, the method of a quasi-random pulse sequence code, the staggered Pulse Code, containing quasi-random bi-polar phase changes, has been expanded and a pulse sequence code has been found which increases the available Doppler range many fold in respect to an equally spaced pulse sequence and improves the signal-to-noise ratio simultaneously.

By pre-cleaning, coherent interference spectral lines are identified in the raw spectrum and their amplitude and frequency exactly calculated; but the respective sine and cosine functions are extracted from the time-domain data.

The remaining data are sequentially treated by applying the individual phase code for each delay range and finding the precise frequency of the largest Doppler amplitude of all ranges, storing it and removing it as sine and cosine functions from the time-domain data sequentially. Recording of amplitude and phase of the strongest signal and repeat of spectrum analysis of the remaining data is necessary.

To accelerate the process, a special purpose computer has been designed to produce the data analysis in real time. Dependent on the data speed and progresses in the Signal Processor Chips (DSP), simpler designs can be constructed.

Non-linear spectrum analysis has been invented to improve the signal-to-noise ratio and to determine the frequency and phase of the found frequencies more accurately under strong noise conditions.

Iterative Spectrum Analysis is also applicable to any other coherent data set and to pre-cleaning of spread spectrum data.

DETAILED DESCRIPTION OF DIFFERENT ASPECTS AND APPLICATIONS OF THE INVENTION

The present invention is a method and apparatus for iterative spectrum analysis of coded pulse sounding data. In the following detailed description, numerous specific details of the invention are set forth to provide a thorough understanding of the invention. However, it will be apparent to those of ordinary skill in the art that these specific details, need not be used to practice the present invention. In other circumstances, well-known structures, materials, and processes have not been shown in detail in order to not unnecessarily obscure the present invention.

Description of the Staggered Pulse Code

Figure 1:
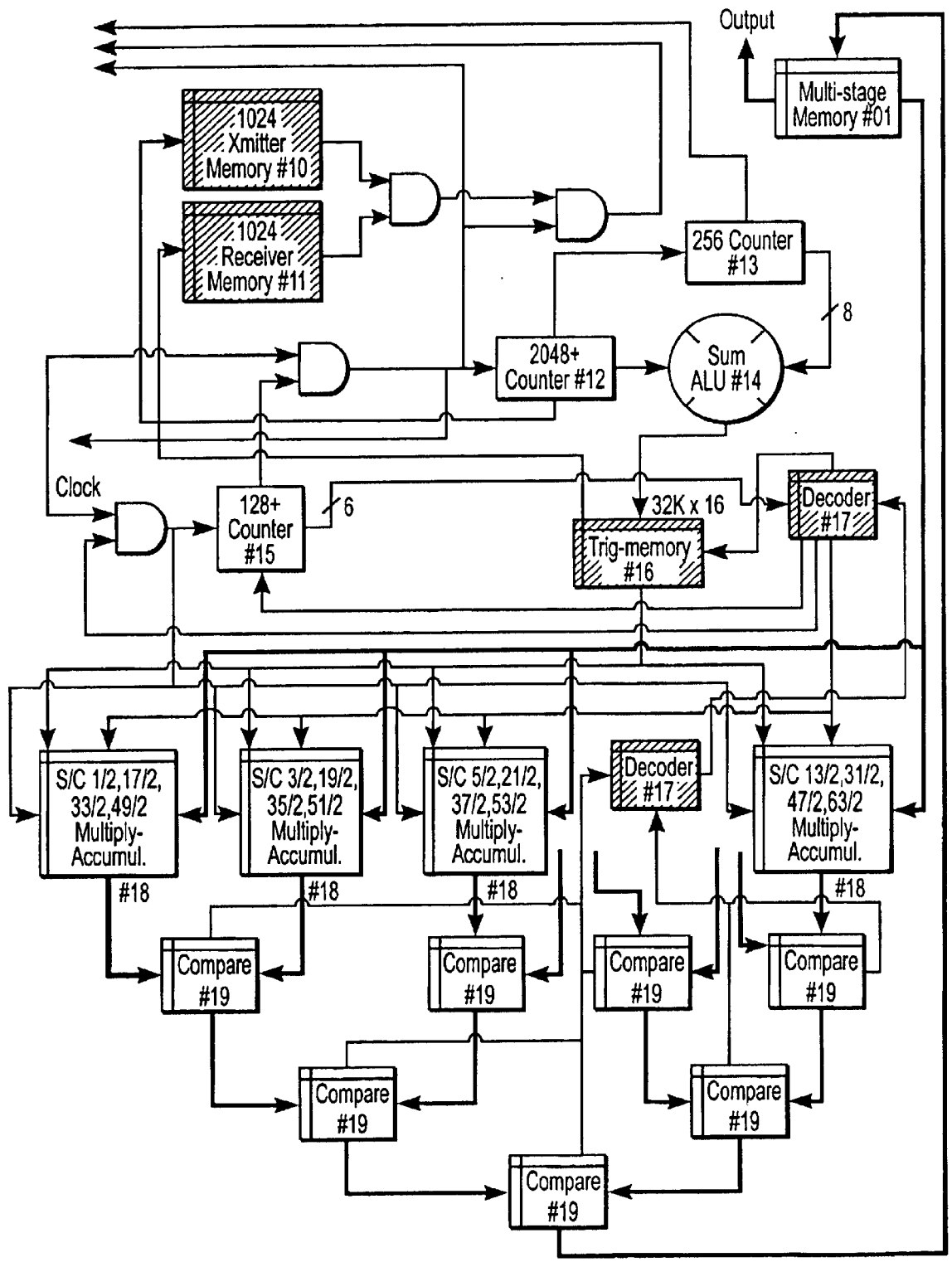
FIG. 1 is a block diagram illustrating one implementation of the iterative spectrum analysis system of the present invention. It has eight parallel processing channels.

To optimize the signal-to-noise ratio, the known staggered pulse method has been modified, as described in a scientific paper (K. Bibl and D. M. Haines (1999), "1024 Staggered Pulse Code for Spacecraft Ionosondes and Radar", International URSI Conference, Ottawa, Canada). Its code has 1024 timing units, called chips in that report (see FIG. 1 of the cited paper). From those 1024 chips, 208 are occupied by transmitter pulses, organized in 102 groups of one, two, or three pulses in a group (table I of the cited paper). In monostatic sounding, no reception is possible during the transmitter times. To give the tuned antenna and the receiver time to recover from the transmitter pulse, 102 chips at the end of each transmitter group are also excluded from sampling. Thus 714 chips are available for reception where sine and cosine samples are taken. This code allows the detection of very large Dopplers, limited only by the double of the chip width. At any transmitted frequency, the code distinguishes up to 1024 Doppler frequencies in the time period given by two consecutive equally spaced pulses covering 256 height ranges. In practical applications, a much smaller number of spectral frequencies are required, for example: 128 for spacecraft ionosondes investigating the magnetosphere, 32 for topside sounders and 4 for ground based ionosondes. Short and large ranges can be optimally sampled with the largest number of samples in a given time.

A distribution for the transmitter pulses was found that allowed, with only 208 transmitter pulses, at least 128 samples for each of 256 height ranges (table II of the cited paper). The phase code of this staggered pulse code is optimized for minimum leakage from any height range to any other, at least for the same Doppler frequency, as table III shows.

Pre-Cleaning of Coherent Interference

To overcome the limits of standard spectrum analysis in cases of coherent signals and/or coherent interferers, a method is described which will sequentially eliminate the biggest interferers in the time domain and thereafter sequentially retrieve the wanted (mostly coded) signals, starting with the largest signal in any height range. Although the method can be applied in many other cases, even in acoustic sounding where the power-line or mechanical frequencies might overwhelm the signal, a specific example of ionospheric sounding with radio waves is given here. Because coherent interference in the frequency ranges from 0.5 to 1.6 and from 6 to 16 MHz may be more than 40 dB above the expected echoes from the ionosphere, it is necessary to pre-clean the coherent interference in order to reduce it by at least 20 dB before applying the phase code. This can be done in a single process by spectrum analyzing all available data, determining the precise frequency and phase of the largest amplitudes and subtracting it from the time samples. It is, however, sometimes better to eliminate the strongest interferer first and re-do the spectrum analysis. For equally spaced pulses a multitude of subsets of data may be analyzed more efficiently to speed up the analysis and to consider the coherence time of the interferer. For example, the data after each transmitter pulse can be analyzed separately and eliminated from the data sub-set.

The Applicant has invented a method to compute the exact frequency and magnitude from the magnitude of the largest spectral line amplitude and its largest direct neighbor: For the magnitude A of the larger sample and the magnitude B of the smaller sample at the frequencies $Fn$ and $Fn+1$, the exact frequency is:

$$F=Fn+B/A+B \text{ if } A \text{ is at } Fn \text{ or } F=Fn+1-B/A+B \text{ if } A \text{ is at } Fn+1.$$

The actual magnitude is:

$$M=A* pi* B/(A+B)*\sin(pi*B(A+B)),$$

while the phase is the weighted average phase. The components of the precise frequency: $C*\cos(2*pi*F)$ and $S*\sin(2*pi*F)$ can be derived the following way. If the components of A are $a+i*c$ and those of B are $b+i*s$ (with $i=-1**0.5$):

$$D=\{(a*A/c*(A+B))+(b*B/s*(A+B))\}**2;$$

$$C=M*(D/(1+D))**0.5$$

and $$S=M*(1/(1+D))**0.5.$$

To speed up the time consuming sin x/x calculations, a precise approximation has been found: For $X=B/(A+B)$:

$$M=A*\{1+((pi*X)**2)/6+((pi*X)**4)*7/360+((pi*X)**6)*31/15120+((pi*X)**8)* 127/6\ 04800\} \text{ (see table IV).}$$

Determining any signal to one eighth of a period (Doppler line spacing) and removing it from the time samples will reduce its leakage by more than 20 dB. The respective sine and cosine functions of the precisely found largest amplitude can then be easily subtracted, either simultaneously or sequentially, from the time samples and the corrected data should be spectrum analyzed again. This process should be repeated until the last Doppler amplitude is smaller than 20 dB below the largest amplitude of the original interferer.

Since this process has been carried out before applying the phase code, its effect on the expected pulse signals is minimal. After the pre-cleaning, the integration of phase-decoded samples for each height range can be executed without limitation by coherent interference even if the interferer were 40 dB above the signal.

Figure 2:
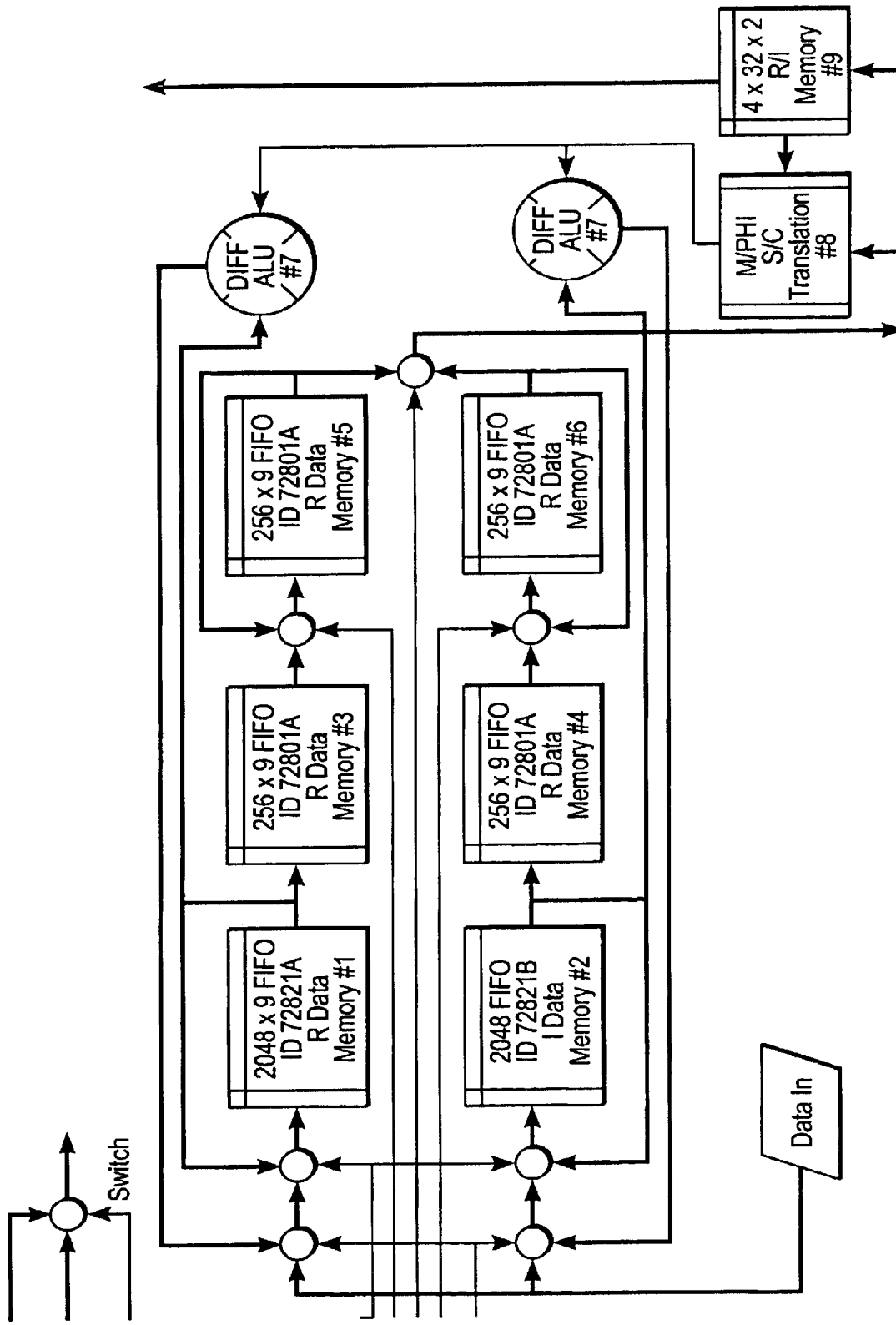
FIG. 2 illustrates details of the data and address storage system of the present invention.

Cleaning of spread-spectrum data could be done in the same way, allowing narrow-band data and interference to exist in the same band as the wide-band data. Even for spectrum analysis of non-coded, small-band data, this method is preferable to standard spectrum analysis (FIG. 2 of the cited paper).

Calculation of the signal spectra for 2,56 range chips

Figure 3:
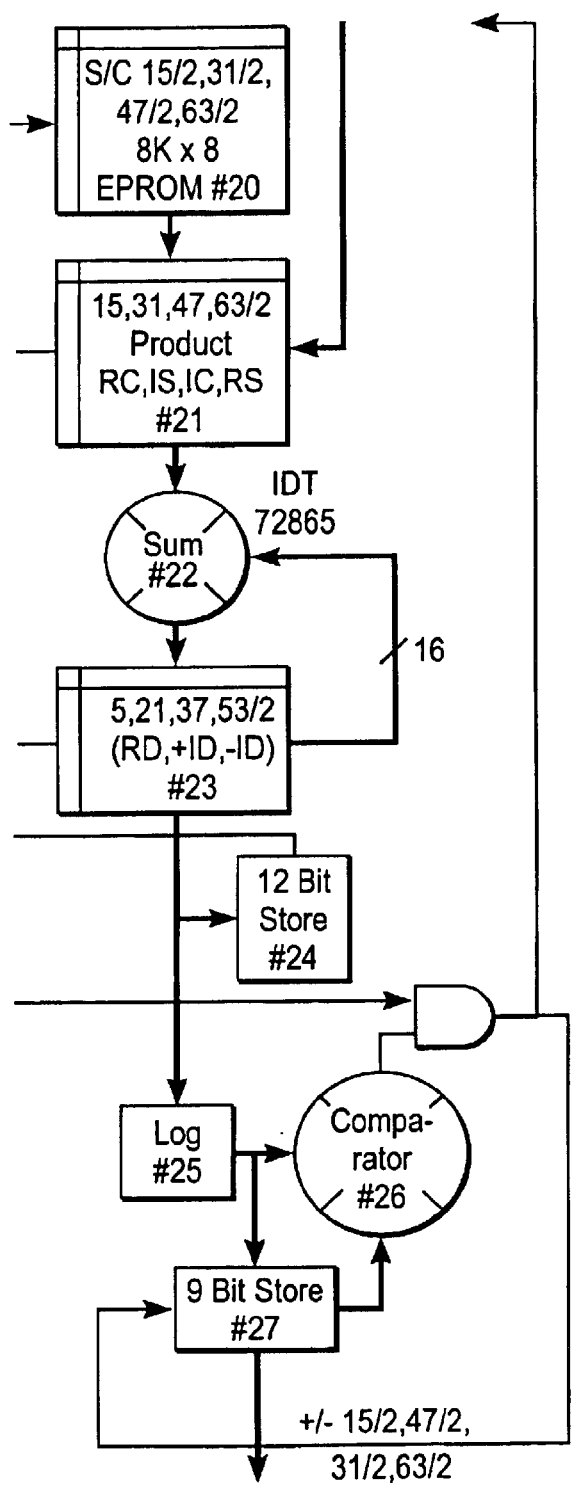
FIG. 3 illustrates details of the multiply-accumulate process of the present invention.
Figure 4:
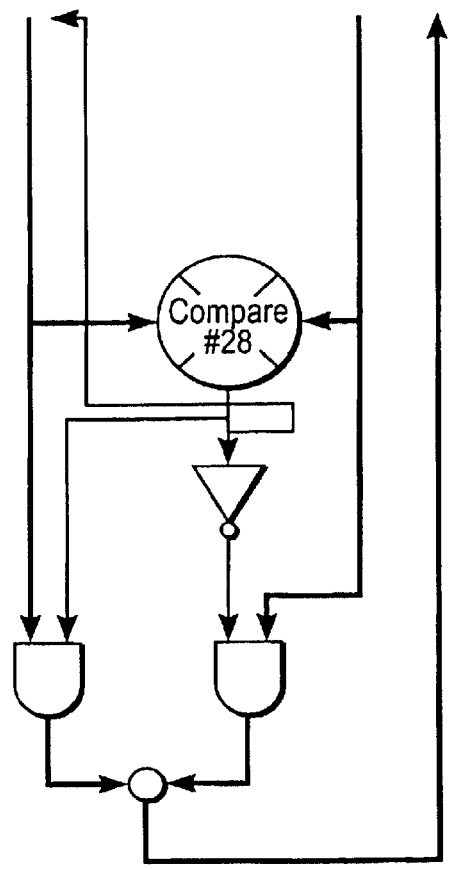
FIG. 4 illustrates the comparison of two of eight different Doppler channels.

For the 1024 chip code, analysis of 128 samples in 256 range gates requires a special effort and can not effectively be achieved by standard spectrum analysis because the data for each height range are distributed over 832 locations (see table II of the cited paper). In addition, leakage between the 256 height ranges is substantial. If the data analysis has to be done in real time, a special purpose computer, imbedded in a standard computer, might be necessary. Using a block diagram (FIG. 1) and three detail drawings (FIGS. 2–4), a description of the proposed solution is presented. FIG. 2 gives the details of the data and address storage. FIG. 3 illustrates the multiply—accumulate process and FIG. 4 shows the comparison of two of eight different Doppler channels.

Data from one of the frequency recordings are stored temporarily in an 8-bit-plus-sign 2048 byte deep first-in first-out memory (FIFO # 1). From those, 128 cosine and 128 sine samples are chosen by the coincidence of the transmitter sequence of 208 pulse locations (# 10) and the 714 locations (#11) of available receiver signals (shifted in accordance with the chosen delay range) and transferred from the 2048 data FIFO (#1) to a much smaller 256 deep FIFO (#3). The sign-bit is modulated by the transmitter phase code. Simultaneously, the addresses of the 128 receiver signals are chosen and temporarily stored in another 256 deep FIFO (#5). Then both FIFO's are transferred to another pair of same size FIFO's with the help of a counter to 128.

Often the number of Doppler frequencies can be limited to +/−32 (or +/−64); Thus, it will be possible to store 4×1024 trigonometric sine and 4×1024 cosine functions in eight eight-bit EPROM registers or to fill a large Random Access Memory (RAM) with all necessary functions before the start of the data processing. Commanded by a counter to 128, the 256 deep FIFO's are emptied by half. The same counter advances a FIFO with addresses of the sine of the trig memories (#20)for multiplication with the respective sine and cosine data samples, which are stored in FIFO's (##5 and 6). First, the products of the cosine samples are multiplied with the respective trig cosine, simultaneously for eight Doppler lines in eight multiplier—accumulator chips (# 21 to 23).

The product of the next sample is added to the respective product of the preceding operation. After adding 128 products, the products of the sine sample and the trig sine are formed and added to the sum of the cosine sample and the cosine trig function. The sums of both products forms the real components of the positive and negative Doppler frequencies. Their 8-bit log amplitude (# 25)is looked up and stored together with the sign. Then, the mixed products are formed. First, the cosine data and sine trig products are added and temporarily stored. After erasing the register, the sine data/cosine trig products are added. Then, the sum of the cosine data/sine trig products, stored in #24, are added back to the sum of the sine data/cosine trig products. This is the imaginary part of the negative Doppler line. The log of this amplitude is formed and compared with the real part. But, only the largest of both is stored to simplify later subtraction of the time amplitude of this spectral line component. Now the same data is used for processing eight Doppler lines, finding the largest of them and comparing them to the value stored in #27. It is certainly important to record the Doppler frequency, which has the higher amplitude.

In the meantime, the large data FIFO has been re-circulated and the receiver data locator memory address has been increased by one to make the data of the next delay range accessible. Also, the trig function address is increased by one count and the whole process is repeated, including the multiplication, summation, addition and comparison. The largest Doppler amplitude of the next delay range is selected and only the largest of this one and the preceding one is stored. This is repeated to cover all 256 delay ranges, when the amplitude of the largest Doppler components of all the ranges found. With seven comparators (#28) the largest amplitude of all the Doppler frequencies in all the delay ranges is stored permanently and is, after multiplication with the respective trig function, subtracted from the data.

Then, the whole procedure is repeated 31 times to produce the 32 largest echoes or noise at a specific transmitter frequency. This analysis does not take longer than the collection of the data for the Low-frequency Sounder of the RPI. To create a multi-dimensional picture of the ionosphere or magnetosphere, this procedure has to be simultaneously carried out for all three receivers and repeated at many frequencies. It is therefore not typically possible to execute it in real time for data from ground-based and top-side ionosondes, unless the number of chosen Doppler frequencies is limited to almost vertical echoes with small Dopplers.

Overcoming the Limited Dynamic Range

There are two independent reasons for the limited dynamic range for staggered pulse codes: cross-talk between the ranges and the substantial background for the Doppler spectrum of a perfectly sinusoidal signal measured by unevenly spaced samples with big gaps. This is the price paid for the additional information available by the vastly increased Doppler spectrum. Even with a duty-cycle of less than 30% for the transmitter pulses, the number of available sample slots for reception in each of the delay ranges is only one sixth of the total sample spaces. In an optimized staggered pulse code, clusters of two and three sequential pulses are allowed to randomize the sequence and to minimize the number of dead ranges which are necessary to give the receiver and the tuned antenna time to recover from the transmitter signal.

Thus, the useful 128 samples for any delay range may have large spaces between each other. For that reason, even the Doppler spectrum of a perfect sine wave has less than 20 dB dynamic range before unwanted Doppler lines appear. Although a phase code for the pulse sequence is applied, it is impossible to optimize the phase code for all delay ranges at all possible Doppler frequencies. This leads to a substantial leakage of the wanted signal into other delay ranges. Therefore, the invented method and apparatus method is so important. If the largest amplitudes are taken out sequentially, their leakage is taken out as well. Thus, the dynamic range is increased substantially and depends only somewhat on the number of large signals. Only if a large number of equal signals in different, but close Doppler lines are present, the invented method is limited.

Non-linear spectrum analysis

In thousands of examples it has been shown that not only the real and the imaginary parts of the spectra of random noise are not correlated, but also the spectra of the higher powers of random noise data. Therefore, in Non-Linear Spectrum Analysis, the real parts of the data functions are multiplied with the first, third, fifth, and seventh power of the trigonometric functions and a weighted average formed to enhance the signal in respect to the noise. The same is done with the imaginary parts. This method improves the signal-to-noise ratio by at least 6 dB in the peak values and more in the average. If the noise is much larger than the signal, larger cleaning can be achieved by multiplying the average with the fourth power of the trigonometric functions. But then the determination of the correct amplitude becomes difficult. Finer frequency and phase steps are necessary to produce the better frequency resolution and the correct amplitude. This method requires removal of the largest signals sequentially, as explained in the preceding chapters.

Thus, an apparatus and method for iterative spectrum analysis of coded pulse sounding data is described. Although the present invention is described herein with reference to a specific preferred embodiment, many modifications and variations therein will readily become apparent to those of ordinary skill in the art in view of the present description of the invention. Accordingly, all such variations and modifications are included within the scope of the present invention as defined by the following claims.

What is claimed is:

1. A method comprising:

generating a long quasi-random staggered pulse sequence code containing quasi-random bi-polar phase changes; and allocating a substantial portion of the pulse sequence code, when there is no transmission, to sine and cosine reception samples.

2. A method comprising:

translating time samples from active equally-spaced or staggered pulse soundings or from passive reception to raw spectrum data;

pre-cleaning the raw spectrum data by identifying the largest coherent interference;

removing sine and cosine functions corresponding to the accurate magnitude and phase of this coherent interference from corresponding time-domain data; and repeating this process until all interference is below a specified level.

3. The method as claimed in 1 further including:

sequentially applying an individual phase code for each delay range;

determining the exact frequency of the largest Doppler amplitude of any delay range;

storing this information and subtracting its values from the time sequence; and repeating the process until a sufficient amount of information is stored.

4. The method as claimed in 2 further including:

translating time samples by non-linear spectrum analysis in averaging the products of the first, third, and fifth power of the time sequence data with the respective power of the sine and cosine functions;

changing the exact frequency and phase of the trigonometric function in small steps to find the largest signal;

recording and eliminating the exact frequency, magnitude and phase of the signal in the time domain; and repeating the process until a sufficient amount of useful data is generated and stored.

* * * * *